(12) United States Patent
Wang et al.

(10) Patent No.: US 11,828,896 B2
(45) Date of Patent: Nov. 28, 2023

(54) COMBINED SUBMARINE SEISMIC ACQUISITION NODE WITH SECONDARY POSITIONING FUNCTION

(71) Applicant: Institute of Geology and Geophysics, Chinese Academy of Sciences, Beijing (CN)

(72) Inventors: Juan Wang, Beijing (CN); Shengquan Zhang, Beijing (CN); Qingyu You, Beijing (CN); Shaoqing Li, Beijing (CN); Yonggang Guo, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/115,806

(22) Filed: Mar. 1, 2023

(65) Prior Publication Data

US 2023/0288597 A1    Sep. 14, 2023

(30) Foreign Application Priority Data

Mar. 10, 2022 (CN) .......................... 202210233795.5

(51) Int. Cl.
    *G01V 1/38*    (2006.01)

(52) U.S. Cl.
    CPC .......... *G01V 1/3808* (2013.01); *G01V 1/3835* (2013.01)

(58) Field of Classification Search
    CPC ............................ G01V 1/308; G01V 1/3835
    See application file for complete search history.

(56) References Cited

U.S. PATENT DOCUMENTS

| | | | |
|---|---|---|---|
| 9,523,780 B2* | 12/2016 | Naes .................... | G01V 1/3852 |
| 10,288,750 B2* | 5/2019 | Hovland ................. | B63B 21/66 |
| 2005/0052951 A1* | 3/2005 | Ray ....................... | G01V 1/3808 |
| | | | 367/188 |
| 2014/0211589 A1* | 7/2014 | Maxwell ................. | G01V 1/18 |
| | | | 367/149 |
| 2016/0349387 A1* | 12/2016 | Rokkan ................ | G01V 1/3808 |

FOREIGN PATENT DOCUMENTS

| | | | | |
|---|---|---|---|---|
| CN | 105785431 A | 7/2016 | | |
| CN | 106886048 A | 6/2017 | | |
| CN | 206833006 A | 1/2018 | | |
| CN | 110691993 A | 1/2020 | | |
| CN | 113759423 A | 12/2021 | | |
| GB | 2422670 A | * | 8/2006 | ............. G01V 1/201 |
| WO | 2016020540 A1 | 2/2016 | | |

* cited by examiner

*Primary Examiner* — Krystine E Breier
(74) *Attorney, Agent, or Firm* — Kaplan Breyer Schwarz, LLP (57) ABSTRACT

Disclosed is a combined submarine seismic acquisition node with a secondary positioning function, including an ocean bottom node connected with an external loading ship; a protective sleeve circumferentially covering outside the ocean bottom node; and response components fixed inside the ocean bottom node, and the response components are configured to send position information of the ocean bottom node, and the response components may perform an information interaction with the loading ship.

6 Claims, 5 Drawing Sheets

COMBINED SUBMARINE SEISMIC ACQUISITION NODE WITH SECONDARY POSITIONING FUNCTION

CROSS-REFERENCE TO RELATED APPLICATIONS

This application claims priority to Chinese Patent Application No. 202210233795.5, filed on Mar. 10, 2022, the contents of which are hereby incorporated by reference.

TECHNICAL FIELD

The application relates to the technical field of offshore oil and gas exploration, and in particular to a combined submarine seismic acquisition node with a secondary positioning function.

BACKGROUND

Ocean bottom geophysical exploration equipment, especially an ocean bottom seismometer (OBS) is an important means to detect offshore oil and gas resources, and is also a development trend in recent years. However, existing ups and downs OB Ss in China are far from meeting requirements of an offshore oil and gas resources exploration. Miniaturization, high density and low cost are main directions of submarine seismic exploration equipment. A system is mainly composed of an ocean bottom node (OBN, also called GOBS), a node positioning device, a deck release and reclaim mechanism, a deck control and data extraction module, etc. At present, the system has achieved good application results in exploration practices of large international oil companies and has become a rookie in the latest technology of an offshore oil and gas exploration.

When the OBNs are used for an acquisition operation, the OBNs are connected in series with flexible cables and put into the ocean bottom from sterns in sequence. Each flexible cable has a sonar buoy at each end for reclaiming and an arrangement after the acquisition. However, this node-type acquisition method not only meets exploration needs of complex terrains, but also an arbitrary adjustment of an acquisition node density meets characteristics of high resolution of an oil and gas exploration. This node-type acquisition method has achieved good application results in exploration practices of large international oil companies and has become the latest technology and important means in the offshore oil and gas exploration.

In an actual seismic data acquisition operation of the OBNs, a working ship puts a geophone at a designed geophone position during a traveling process. Due to a comprehensive influence of hull movements, equipment environments, artificial throwing errors, sea water speed changes, ocean currents and tides, ship speed changes, sea weathers and other factors, an actual position of the geophone sunk on the ocean bottom is often inconsistent with the designed geophone position. Therefore, secondary positioning processing for the OBNs is needed to ensure a subsequent imaging profile quality.

At present, two technologies are mainly used to solve a problem of accurate positioning of the geophone: first break positioning and acoustic positioning. A positioning accuracy of a first break method is low, and only a deviation trend of an underwater cable may be obtained, but an exact actual position of the geophone may not be obtained. Moreover, the acquisition operation may not be carried out during positioning, so a construction efficiency is affected. Therefore, an acoustic positioning system based on an acoustic sensor is now used in a complete set of submarine cable secondary positioning system.

A development of underwater acoustic positioning technology makes it possible for an accurate positioning of the OBNs. An acoustic secondary positioning technology uses a sonar technology for the secondary positioning of the submarine cable that has sunk into the ocean bottom and is relatively stable. The accurate positioning of the OBNs may be realized by binding the geophone and an underwater acoustic transponder, according to a sound wave transmission time and combining the global positioning system (GPS) coordinates of a measuring ship, thus completing a whole seismic exploration process. According to a conventional method, an external self-contained acoustic transponder is bound to one OBN, and an acoustic positioning host is used for a reposition of the ocean bottom (secondary positioning). For example, both GEOTAG of French Sersel company and TZT of American Sonardyne company need to be tied and fixed to the OBN, so an operation complexity is increased, a maintenance cost and a workload of offshore construction are increased.

CN114609673A discloses a combined submarine seismic acquisition node. A cabin adopts a titanium alloy shell, and is internally equipped with a digital collector, an omnidirectional geophone, a network communication module, a GPS, an electronic compass and a combined power supply. The application is used for a high-density shallow submarine seismic observation and the oil and gas exploration, and provides a new technical means for a deep-water oil and gas exploration in China. However, there is a protective sleeve protruding at both ends on the shell of a structure, so the protective sleeve is easy to collide with a releasing device during a hoisting process of a tether, resulting in a damage of the protective sleeve. Moreover, an ordinary temperature compensated crystal oscillator with a large clock drift is used in the acquisition node, so a data interpolation and resampling are needed in a later stage. Since a secondary positioning function is not integrated in the acquisition node, an external bundled transponder is required, thus increasing a difficulty of instrument maintenance and a complexity of offshore construction.

SUMMARY

Embodiments according to the application aim to solve or improve at least one of above technical problems.

A first aspect of the embodiments according to the application is to provide a combined submarine seismic acquisition node with a secondary positioning function.

The embodiment of the first aspect of the application provides the combined submarine seismic acquisition node with the secondary positioning function, including an ocean bottom node connected with an external loading ship; a protective sleeve circumferentially covering outside the ocean bottom node; and response components fixed inside the ocean bottom node, and the response components are configured to send position information of the ocean bottom node, and the response components may perform an information interaction with the loading ship.

According to the combined submarine seismic acquisition node with the secondary positioning function provided by the application, in order to facilitate a deployment and prevent a shell from being damaged during an offshore construction, the shell is redesigned; original protective sleeves on both sides of the shell are removed, and the response components are retracted into the shell, so as to avoid the protruding protective sleeves from colliding with ship-borne hoisting equipment, causing the protective sleeves to be damaged, and even falling off as a whole, resulting in a loss of internal instruments. In addition, a protective sleeve with a cylindrical overall shape is additionally used around the ocean bottom node, so the ocean bottom node is more rounded than the original application. The protective sleeve plays a role in preventing accidental jamming and buffer impacts during releasing.

The ocean bottom node according to the application carries out the information interaction with a ship-borne acoustic positioning host on the loading ship through the response components, so that a device has a secondary positioning function, and an offset correction is more accurate and faster when data information is pre-processed. A seismic signal acquisition circuit and a secondary positioning response circuit share an internal space, a shell and a battery pack of the ocean bottom node, thus facilitating an instrument maintenance and greatly reducing an operation complexity.

In addition, a built-in domestic atomic clock is used as a master clock. After several tens of days continuous testing, a frequency accuracy and a long-term stability of the clock have reached a level of an imported atomic clock, and a short-term frequency stability and a monthly aging rate of the clock may reach 10-10 orders of magnitude. This atomic clock makes a total clock drift of the acquisition node less than one sampling period after working for one month, so there is no need to conduct a data interpolation and resampling in a later data pre-processing, and processing steps are simplified.

In addition, technical schemes provided according to the embodiments of the application may also have following additional technical features.

In any of the above technical schemes, the response component includes a transducer, and the ocean bottom node is provided with an adapter for placing the transducer, and one end of the adapter has a hollow structure; and the transducer is configured to perform the information interaction between the response components and a hull.

In this technical scheme, an electrical energy and an acoustic energy may be mutually converted by the transducer, and the hollow structure at one end of the adapter enables the transducer to be fixed and located in a protection of the shell of the ocean bottom node; therefore, unnecessary damages of the transducer are avoided, a structure protruding to an outside is reduced, an overall structure is more regular, and a deployment of a single cable for a plurality of ocean bottom nodes is facilitated; and the transducer is configured to perform the information interaction between the response components and the hull, so that positioning information may be transmitted between the ocean bottom node and the hull, and secondary positioning may be performed.

In any of the above technical schemes, the response component further includes a threaded column fixed on the transducer, and an other end of the adapter is provided with an installation hole matched with the threaded column.

In this technical scheme, the transducer may be fixed on the adapter through a cooperation between the threaded column and the installation hole. The transducer may be protected by the shell of the ocean bottom node through an above installation mode, and an interference of the shell on information transmission of the transducer may be reduced. Moreover, a structure of the installed threaded column and the installation hole is sealed after being fixed by an contact between the transducer and the adapter, so as to avoid erosion of external seawater on the threaded column and the installation hole, to ensure an integrity of the fixed structure after a long-term use, and to make disassembly and repair more convenient and labor-saving.

In any of the above technical schemes, the ocean bottom node is provided with a through hole communicating with the adapter, and an end of the transducer with a distance from the threaded column longitudinally corresponds to the through hole.

In this technical scheme, one end of the transducer may be exposed through the through hole; and meanwhile, the end of the transducer with a distance from the threaded column longitudinally corresponds to the through hole, so that the whole transducer may be under a shielding protection of the ocean bottom node, taking into account both protection and smooth information interaction.

In any of the above technical schemes, the protective sleeve is provided with an exposure hole. When the protective sleeve is covered on the ocean bottom node, the exposure hole is opposite to a port of the through hole.

In the technical scheme, the exposure hole is added. When the protective sleeve is covered on the ocean bottom node, the exposure hole is opposite to the port of the through hole, so the shielding of the protective sleeve to the transducer is further avoided. Meanwhile, due to a wall thickness of the protective sleeve, the end of the transducer with a distance from the threaded column may be at a certain distance from the outer wall of the protective sleeve in a case of exposure, thus preventing the cable from contacting the transducer, playing a role in further protection and enhancing a communication of information.

In any of the above technical schemes, the ocean bottom node is provided with a hook hanger, and the protective sleeve is provided with a limiting hole adapted to the hook hanger. When the hook hanger is in the limiting hole, an end of the hook hanger protrudes out of the protective sleeve. The hook hanger is used to connect with the cable on the hull, so that the hull may simultaneously drive more than one ocean bottom node through the cable.

In this technical scheme, the hook hanger may be hooked and fixed with the cable, so that the single cable may fix more than one ocean bottom node at the same time, and the protective sleeve is provided with the limiting hole adapted to the hook hanger, so that the protective sleeve may not rotate relative to the ocean bottom node after being sleeved in a circumferential direction. Meanwhile, the exposure hole and the through hole may correspond to each other more easily during a sleeve connection, thus reducing a difficulty of early design and processing; and the end of the hook hanger protrudes out of the protective sleeve and outwards, so that the ocean bottom node may be better fixed on the cable through the hook hanger.

In any of the above technical schemes, upper and lower ends of the outer wall of the ocean bottom node are respectively provided with extension edges, and end covers are fixed on the extension edges by bolts, and the end covers are used for sealing the ocean bottom node.

In this technical scheme, the ocean bottom node may be symmetrically opened and closed up and down by fixing the end covers with the extension edges, so it is convenient for early processing and a later internal structure maintenance. The end covers fixed by the bolts may seal the ocean bottom node when the ocean bottom node is placed in seawater, thus ensuring that the ocean bottom node may not leak internally.

In any of the above technical schemes, an inner wall of the protective sleeve is circumferentially provided with a limiting rib. When the protective sleeve is covered on the ocean bottom node, the limiting rib is located between the two extension edges.

In this technical scheme, the protective sleeve may be clamped and fixed with the upper and lower two symmetrically arranged extension edges by setting the limiting rib in the circumferential direction inside the protective sleeve, so longitudinal relative sliding after the protective sleeve is sleeved on the ocean bottom node is avoided, a firm fixation between the protective sleeve and the ocean bottom node is ensured, and falling off during repeated hoisting is avoided. Meanwhile, a limiting function helps to keep a shape of the protective sleeve stable and reduce a deformation.

In any of the above technical schemes, the limiting rib is provided with setting holes, and the bolts are inserted into the setting holes when the limiting rib is limited between the two extension edges.

In this technical scheme, the setting holes are set in the limiting rib and are inserted and matched with the bolts, so that the bolts may fix the protective sleeve together when fixing the extension edges and the end covers. Therefore, an integration between the protective sleeve and the ocean bottom node is further improved, a failure of a protective action caused by the deformation of the protective sleeve under a pressure of seawater is avoided, and even a failure of the cable due to a hanging of external structures is avoided.

In any of the above technical schemes, the protective sleeve is integrally molded with a polyurethane material, and/or the outer wall of the protective sleeve is provided with an arc surface.

In the technical scheme, the protective sleeve has a certain deformation ability since the protective sleeve is integrally molded with the polyurethane material, so that the protective sleeve may be more easily sleeved on the ocean bottom node, and the cost of maintenance and overhauls is reduced; and the outer wall of the protective sleeve is provided with the arc surface, so the outer wall of the protective sleeve is more rounded, facilitating movements on clamping plates of a seawall and the hull.

Additional aspects and advantages of the embodiments according to the application may become apparent in a following description, or may be learned by practices of the embodiments according to the application.

DETAILED DESCRIPTION OF THE EMBODIMENTS

In order to understand above objects, features and advantages of the application clearer, the application may be described in further detail with reference to attached drawings and specific embodiments. It should be noted that the embodiments of the present application and the features in the embodiments may be combined with each other without conflict.

In a following description, many specific details are set forth in order to fully understand the application. However, the application may be implemented in other ways than those described here, and therefore, a protection scope of the application is not limited by the specific embodiments disclosed below.

With reference to FIGS. 1-4, an embodiment of a first aspect of the application provides a combined submarine seismic acquisition node with a secondary positioning function, including an ocean bottom node 1 connected with an external loading ship; a protective sleeve 2 circumferentially covering outside the ocean bottom node 1; and response components fixed inside the ocean bottom node 1, and the response components are configured to send position information of the ocean bottom node 1, and the response components may perform an information interaction with the loading ship.

According to the combined submarine seismic acquisition node with the secondary positioning function provided by the application, in order to facilitate a deployment and prevent a shell from being damaged during an offshore construction, the shell is redesigned; original protective sleeves on both sides of the shell are removed, and the response components are retracted into the shell, so as to avoid the protruding protective sleeves from colliding with ship-borne hoisting equipment, causing the protective sleeves to be damaged, and even falling off as a whole, resulting in a loss of internal instruments. In addition, a protective sleeve with a cylindrical overall shape is additionally used around the ocean bottom node 1, so the ocean bottom node 1 is more rounded than the original application. The protective sleeve plays a role in preventing accidental jamming and buffer impacts during releasing.

The ocean bottom node 1 according to the application carries out the information interaction with a ship-borne acoustic positioning host on the loading ship through the response components, so that a device has a secondary positioning function, and an offset correction is more accurate and faster when data information is pre-processed. A seismic signal acquisition circuit and a secondary positioning response circuit share an internal space, a shell and a battery pack of the ocean bottom node 1, thus facilitating an instrument maintenance and greatly reducing an operation complexity.

In addition, a built-in domestic atomic clock is used as a master clock. After several tens of days continuous testing, a frequency accuracy and a long-term stability of the clock have reached a level of an imported atomic clock, and a short-term frequency stability and a monthly aging rate of the clock may reach 10-10 orders of magnitude. This atomic clock makes a total clock drift of the acquisition node less than one sampling period after working for one month, so there is no need to conduct a data interpolation and resampling in a later data pre-processing, and processing steps are simplified.

Specifically, a seismic signal acquisition process according to the application is the same as an original design. A seismic wave is converted into an analog electrical signal through a front-end three-component geophone and a sensor of the hydrophone. The analog signal is converted into a digital signal by an analog-to-digital conversion circuit through a spread spectrum and preamplifier circuit and transmitted to a main control microcontroller unit (MCU), and the MCU stores these data in a storage medium. When one ocean bottom node (OBN) is salvaged to a deck after an acquisition, data may be extracted through a network. The OBN is internally equipped with a rechargeable lithium battery pack, which may be used for a continuous acquisition and storage for more than 40 days when fully charged. In addition, the OBN integrates a domestic chip-level atomic clock to provide a high-precision clock for a signal acquisition. An attitude and a magnetic declination of the OBN at an acquisition time are recorded by a compass and attitude module for later data processing.

In any of the above embodiments, as shown in FIGS. 1-4, the response components include a transducer 3, and the ocean bottom node 1 is provided with an adapter 4 for placing the transducer 3, and one end of the adapter 4 has a hollow structure; and the transducer 3 is configured to perform the information interaction between the response components and a hull.

In this embodiment, an electrical energy and an acoustic energy may be mutually converted by the transducer 3, and the hollow structure at one end of the adapter 4 enables the transducer 3 to be fixed and located in a protection of the shell of the ocean bottom node 1; therefore, unnecessary damages of the transducer 3 are avoided, a structure protruding to an outside is reduced, an overall structure is more regular, and a deployment of a single cable for a plurality of ocean bottom nodes 1 is facilitated; and the transducer 3 is configured to perform the information interaction between the response components and the hull, so that positioning information may be transmitted between the ocean bottom node 1 and the hull, and secondary positioning may be performed.

In any of the above embodiments, as shown in FIGS. 1-4, the response components further include a threaded column 301 fixed on the transducer 3, and an other end of the adapter 4 is provided with an installation hole 401 matched with the threaded column 301.

In this embodiment, the transducer 3 may be fixed on the adapter 4 through a cooperation between the threaded column 301 and the installation hole 401. The transducer 3 may be protected by the shell of the ocean bottom node 1 through an above installation mode, and an interference of the shell on information transmission of the transducer 3 may be reduced. Moreover, a structure of the installed threaded column 301 and the installation hole 401 is sealed after being fixed by an contact between the transducer 3 and the adapter 4, so as to avoid erosion of external seawater on the threaded column 301 and the installation hole 401, to ensure an integrity of the fixed structure after a long-term use, and to make disassembly and repair more convenient and labor-saving.

Figure 1:
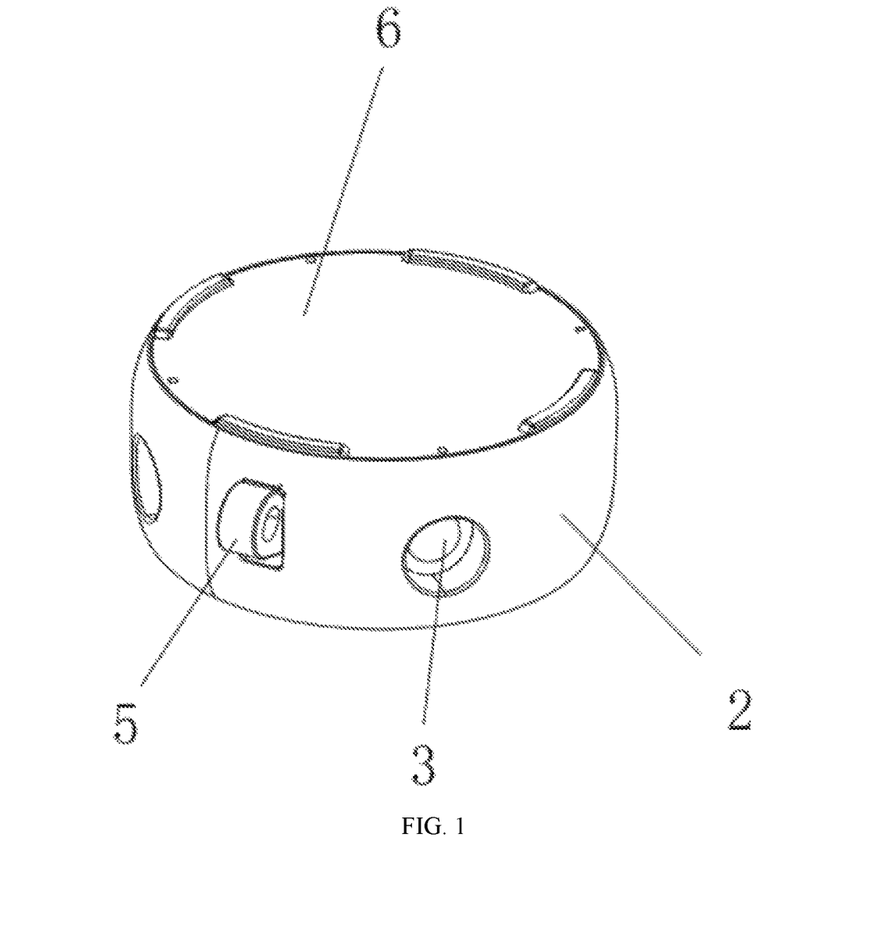
FIG. 1 is a schematic structural diagram according to the application.
Figure 2:
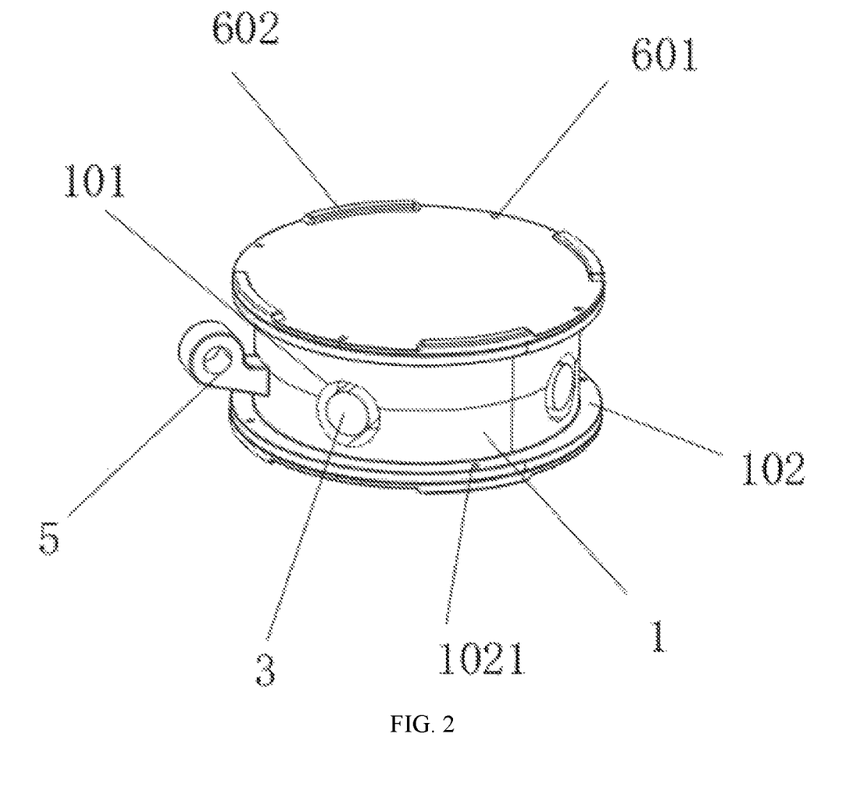
FIG. 2 is a schematic diagram of an ocean bottom node and a connection structure thereof according to the application.
Figure 3:
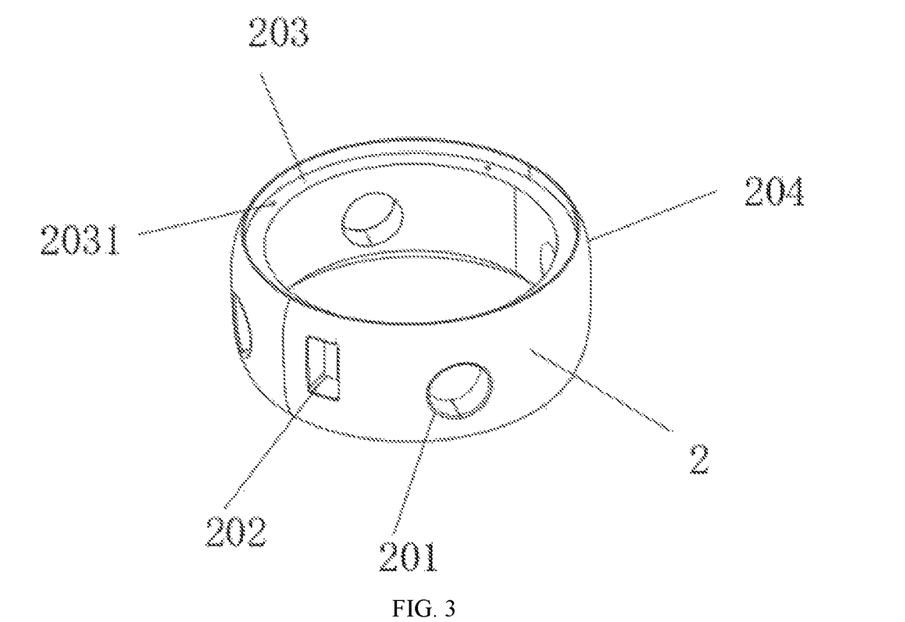
FIG. 3 is a schematic structural diagram of a protective sleeve according to the application.
Figure 4:
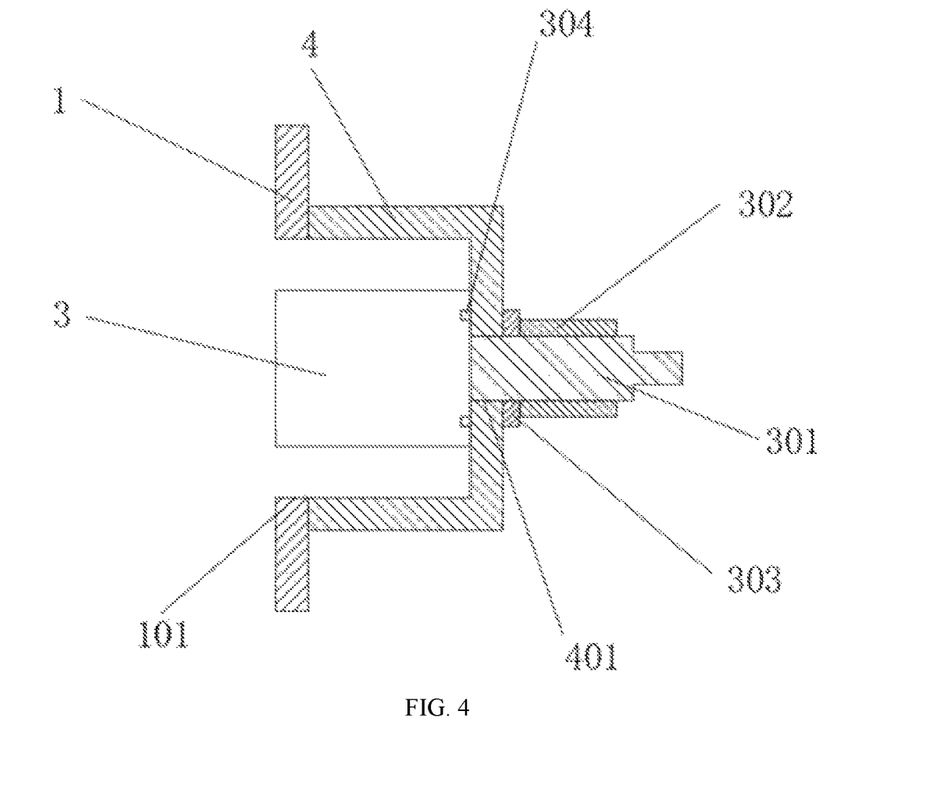
FIG. 4 is a schematic sectional view of an adapter and a connecting structure thereof according to the application.

In an embodiment, a hexagon nut 302 is screwed on the threaded column, and a fixed elastic pad 303 is clamped between the hexagon nut 302 and a side wall of one end of the adapter located inside the ocean bottom node, ensuring that the threaded column and the transducer fixed by the threaded column may be stably fixed on the adapter.

In an embodiment, the hollow structure of the adapter located in the seawater is provided with a positioning protrusion 304 corresponding to the transducer transversely, and the transducer is provided with a groove adapted to the positioning protrusion, so as to position the transducer and prevent the transducer from rotating after being fixed.

In any of the above embodiments, as shown in FIGS. 1-4, the ocean bottom node 1 is provided with a through hole 101 communicating with the adapter 4, and an end of the transducer 3 with a distance from the threaded column 301 longitudinally corresponds to the through hole 101.

In this embodiment, one end of the transducer 3 may be exposed through the through hole 101; and meanwhile, the end of the transducer 3 with a distance from the threaded column 301 longitudinally corresponds to the through hole 101, so that the whole transducer 3 may be under a shielding protection of the ocean bottom node 1, taking into account both protection and smooth information interaction.

In any of the above embodiments, as shown in FIGS. 1-4, the protective sleeve 2 is provided with an exposure hole 201. When the protective sleeve 2 is covered on the ocean bottom node 1, the exposure hole 201 is opposite to a port of the through hole 101.

In this embodiment, the exposure hole 201 is added. When the protective sleeve 2 is covered on the ocean bottom node 1, the exposure hole 201 is opposite to the port of the through hole 101, so the shielding of the protective sleeve 2 to the transducer 3 is further avoided. Meanwhile, due to a wall thickness of the protective sleeve 2, the end of the transducer 3 with a distance from the threaded column 301 may be at a certain distance from the outer wall of the protective sleeve 2 in a case of exposure, thus preventing the cable from contacting the transducer 3, playing a role in further protection and enhancing a communication of information.

In any of the above embodiments, as shown in FIGS. 1-4, the ocean bottom node 1 is provided with a hook hanger 5, and the protective sleeve 2 is provided with a limiting hole 202 adapted to the hook hanger 5. When the hook hanger 5 is in the limiting hole 202, an end of the hook hanger 5 protrudes out of the protective sleeve 2. The hook hanger 5 is used to connect with the cable on the hull, so that the hull may simultaneously drive more than one ocean bottom node 1 through the cable.

In this embodiment, the hook hanger 5 may be hooked and fixed with the cable, so that the single cable may fix more than one ocean bottom node 1 at the same time, and the protective sleeve is provided with the limiting hole 202 adapted to the hook hanger 5, so that the protective sleeve may not rotate relative to the ocean bottom node 1 after being sleeved in a circumferential direction. Meanwhile, the exposure hole 201 and the through hole 101 may correspond to each other more easily during a sleeve connection, thus reducing a difficulty of early design and processing; and the end of the hook hanger 5 protrudes out of the protective sleeve 2 and outwards, so that the ocean bottom node 1 may be better fixed on the cable through the hook hanger 5.

In any of the above embodiments, as shown in FIGS. 1-4, upper and lower ends of the outer wall of the ocean bottom node 1 are respectively provided with extension edges 102, and end covers 6 are fixed on the extension edges 102 by bolts, and the end covers 6 are used for sealing the ocean bottom node 1.

In this embodiment, the ocean bottom node 1 may be symmetrically opened and closed up and down by fixing the end covers 6 with the extension edges 102, so it is convenient for early processing and a later internal structure maintenance. The end covers 6 fixed by the bolts may seal the ocean bottom node 1 when the ocean bottom node 1 is placed in seawater, thus ensuring that the ocean bottom node 1 may not leak internally.

In an embodiment, a surface of each end cover with a distance from the ocean bottom node is provided with at least two arc-shaped protrusions 602 in the circumferential direction. On the one hand, a stacked storage of each ocean bottom node 1 (OBN) may be embedded with each other, and each ocean bottom node 1 (OBN) may be limited and stuck with each other so as not to slide off sides; and on the other hand, the arc-shaped protrusions 602 may be more easily coupled with a seabed medium after the ocean bottom node 1 sinks into the ocean bottom, so as to improve a signal-to-noise ratio of submarine seismic signals and prevent seabed ocean currents from moving. Specifically, four arc-shaped protrusions 602 are arranged on each end cover of the device at equal intervals in the circumferential direction.

In an embodiment, each end cover is provided with fixing holes 601, and each extension edge is correspondingly provided with threaded holes 1021. The bolts are inserted into the fixing holes 601 and screwed with the threaded holes 1021 to fix each end cover and each extension edge.

In any of the above embodiments, as shown in FIGS. 1-4, an inner wall of the protective sleeve 2 is circumferentially provided with a limiting rib 203. When the protective sleeve 2 is covered on the ocean bottom node 1, the limiting rib 203 is located between the two extension edges 102.

In this embodiment, the protective sleeve 2 may be clamped and fixed with the upper and lower two symmetrically arranged extension edges 102 by setting the limiting rib 203 in the circumferential direction inside the protective sleeve 2, so longitudinal relative sliding after the protective sleeve 2 is sleeved on the ocean bottom node 1 is avoided, a firm fixation between the protective sleeve 2 and the ocean bottom node 1 is ensured, and falling off during repeated hoisting is avoided. Meanwhile, a limiting function helps to keep a shape of the protective sleeve 2 stable and reduce a deformation.

In any of the above embodiments, as shown in FIGS. 1-4, the limiting rib 203 is provided with setting holes 2031, and the bolts are inserted into the setting holes 2031 when the limiting rib 203 is limited between the two extension edges 102.

In this embodiment, the setting holes 2031 are set in the limiting rib 203 and are inserted and matched with the bolts, so that the bolts may fix the protective sleeve 2 together when fixing the extension edges 102 and the end covers 6. Therefore, an integration between the protective sleeve 2 and the ocean bottom node 1 is further improved, a failure of a protective action caused by the deformation of the protective sleeve 2 under a pressure of seawater is avoided, and even a failure of the cable due to a hanging of external structures is avoided.

In any of the above embodiments, as shown in FIGS. 1-4, the protective sleeve 2 is integrally molded with a polyurethane material, and/or the outer wall of the protective sleeve 2 is provided with an arc surface 204.

In this embodiment, the protective sleeve 2 has a certain deformation ability since the protective sleeve 2 is integrally molded with the polyurethane material, so that the protective sleeve 2 may be more easily sleeved on the ocean bottom node 1, and the cost of maintenance and overhauls is reduced; and the outer wall of the protective sleeve 2 is provided with the arc surface 204, so the outer wall of the protective sleeve 2 is more rounded, facilitating movements on clamping plates of a seawall and the hull.

Figure 5:
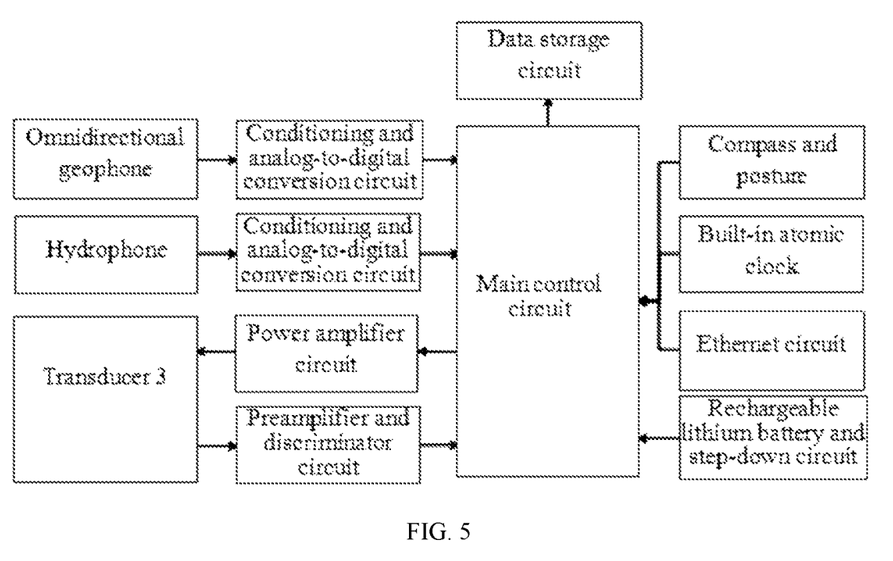
FIG. 5 is a schematic diagram of a working logic of an ocean bottom node (OBN) according to the application.

As shown in FIG. 5, when a ship-borne host sends out an acoustic signal through the transducer 3, the transducer 3 fixed with the ocean bottom node 1 (OBN) sends out a response signal quickly after receiving an excitation signal, and the ship-borne host receives the response signal and records a propagation duration of each signal and global positioning system (GPS) position information of a positioning ship at that time. The system obtains distances between sending and receiving by measuring time delay values of the ship-borne host at different positions, and calculates a network adjustment by using a principle of least square method to complete a position calibration of the ocean bottom node 1 (OBN). Therefore, the application needs to realize an underwater acoustic response function in an OBN pressure chamber. As shown in FIG. 5, the underwater acoustic response function in the OBN is mainly realized by the transducer 3, a power amplifier circuit, a preamplifier and discriminator circuit, a conditioning and analog-to-digital conversion circuit, and a main control circuit. Necessary components such as a lithium battery, the atomic clock, a compass, a geophone and a hydrophone are also arranged inside the ocean bottom node.

Specific implementation steps are as follows:

underwater acoustic numbers are set and the clock is set before releasing the ocean bottom nodes 1 (OBN). The ocean bottom nodes 1 (OBN) may be tied to the cable of a carrier after entering an acquisition mode, and a spacing of each ocean bottom node 1 (OBN) is determined according to survey line requirements, and then the ocean bottom nodes 1 (OBN) are released into the sea according to designed survey line points. When a survey ship deploys the survey lines of the ocean bottom nodes 1 (OBN), the survey ship simultaneously uses the ship-borne acoustic positioning host for the secondary positioning of each deployed ocean bottom node 1 (OBN). If deviations of the ocean bottom nodes 1 (OBN) of one survey line from the design points are too large at this time, the ocean bottom nodes 1 may be pulled out of the water and deployed again at the design points. A floating ball is tied at an end of the cable for reclaiming. A seismic source ship may start a blasting operation after the deployment of each survey line is completed. The ocean bottom nodes 1 (OBN) on each survey line may be salvaged through the floating ball at the end of the cable after the seismic source ship finishes the operation.

In an description of the application, it is necessary to understand that an orientation or position relationship indicated by terms "longitudinal", "horizontal", "up", "down", "front", "back", "left", "right", "vertical", "horizontal", "top", "bottom", "inside", "outside", etc. is based on the orientation or position relationship shown in the attached drawings, only for a convenience of describing the application, rather than indicating or implying that the device or element referred to must have a specific orientation, be constructed and operated in a specific orientation. Therefore, the terms may not be understood as a limitation of the application.

The above-mentioned embodiments only describe a preferred mode of the application, and do not limit the scope of the application. Under a premise of not departing from a design spirit of the application, various modifications and improvements made by ordinary technicians in the field to the technical scheme of the application may fall within the protection scope determined by claims of the application.

What is claimed is:
1. A combined submarine seismic acquisition node with a secondary positioning function, comprising:
   an ocean bottom node connected with an external hull;
   a protective sleeve circumferentially covering outside the ocean bottom node; and
   response components fixed inside the ocean bottom node, wherein the response components are configured to send position information of the ocean bottom node, and the response components perform an information interaction with the hull;

the ocean bottom node is provided with a hook hanger, and the protective sleeve is provided with a limiting hole adapted to the hook hanger; and an end of the hook hanger protrudes out of the protective sleeve when the hook hanger is located in the limiting hole, wherein the hook hanger is used to connect with a cable on the hull to make the hull simultaneously drive more than one ocean bottom node through the cable;

upper and lower ends of an outer wall of the ocean bottom node are respectively provided with extension edges, and end covers are fixed on the extension edges by bolts, and the end covers are used for sealing the ocean bottom node;

an inner wall of the protective sleeve is circumferentially provided with a limiting rib, wherein the limiting rib is located between the two extension edges when the protective sleeve is covered on the ocean bottom node; and the limiting rib is provided with setting holes, wherein the bolts are inserted into the setting holes when the limiting rib is limited between the two extension edges, and the protective sleeve is fixed together when the two extension edges and the end covers are fixed.

2. The combined submarine seismic acquisition node with the secondary positioning function according to claim 1, wherein the response components comprise a transducer, and the ocean bottom node is provided with an adapter for placing the transducer, and one end of the adapter has a hollow structure, wherein the transducer is configured to perform the information interaction between the response components and the hull.

3. The combined submarine seismic acquisition node with the secondary positioning function according to claim 2, wherein the response components further comprise a threaded column fixed on the transducer, and an other end of the adapter is provided with an installation hole matched with the threaded column.

4. The combined submarine seismic acquisition node with the secondary positioning function according to claim 3, wherein the ocean bottom node is provided with a through hole communicating with the adapter, and an end of the transducer with a distance from the threaded column longitudinally corresponds to the through hole.

5. The combined submarine seismic acquisition node with the secondary positioning function according to claim 4, wherein the protective sleeve is provided with an exposure hole, and the exposure hole is opposite to a port of the through hole when the protective sleeve is covered on the ocean bottom node.

6. The combined submarine seismic acquisition node with the secondary positioning function according to claim 1, wherein the protective sleeve is integrally molded with a polyurethane material, and provided with an arch surface together with an outer wall of the protective sleeve or the outer wall of the protective sleeve is provided with the arch surface.

* * * * *